United States Patent
Chakrobartty et al.

(10) Patent No.: US 11,710,113 B2
(45) Date of Patent: Jul. 25, 2023

(54) LOCATION BASED REGISTER RULES

(71) Applicant: Walmart Apollo, LLC, Bentonville, AR (US)

(72) Inventors: Shuvro Chakrobartty, Bentonville, AR (US); Edward Sherrill, Rogers, AR (US); Gopi Kishore Danda, Bentonville, AR (US); Britto Michaelsamy, Bentonville, AR (US); Prasanna Rajendran, Bentonville, AR (US); John Michael Humphrey, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 166 days.

(21) Appl. No.: 15/277,138

(22) Filed: Sep. 27, 2016

(65) Prior Publication Data
US 2017/0091744 A1    Mar. 30, 2017

Related U.S. Application Data

(60) Provisional application No. 62/233,653, filed on Sep. 28, 2015.

(51) Int. Cl.
*G06Q 20/20*    (2012.01)
*G06Q 30/06*    (2012.01)
(Continued)

(52) U.S. Cl.
CPC ....... *G06Q 20/202* (2013.01); *G06Q 30/0623* (2013.01); *G06Q 20/32* (2013.01);
(Continued)

(58) Field of Classification Search
CPC .. G06Q 20/202; G06Q 20/20; G06Q 20/3278; G06Q 20/209; G06Q 30/06; G06Q 30/0623
(Continued)

(56) References Cited

U.S. PATENT DOCUMENTS 7,308,423 B1 *  12/2007  Woodward ......... G06Q 30/0601
                                                        705/26.25
8,538,826 B1 *   9/2013  Lai ..................... G06Q 30/0635
                                                        705/26.1
(Continued)

OTHER PUBLICATIONS

Wang, Ling. Retail Environment Features that Affect Smoking Behavior in Changsha, China. The Ohio State University. ProQuest Dissertations Publishing, 2015. (Year: 2015).*
(Continued)

*Primary Examiner* — Nathan C Uber
*Assistant Examiner* — Fawaad Haider
(74) *Attorney, Agent, or Firm* — Fitch, Even, Tabin & Flannery LLP (57) ABSTRACT

A system, method and computer readable medium for dynamically determining location-based rules affecting item sales at POS registers for a particular location and for distributing the location-based rules to the POS registers is discussed. A location-based ruleset of rules regulating sales of items at an individual store is created and transmitted to the store along with a rule group to item map file that maps rules and warnings to individual store items. A rules engine at the store provides updated item sale rules and warnings to POS registers based on the location-based ruleset and rule group to item map file. Embodiments thus provide an improved system for updating POS registers at different store locations with location-based rules specific to the store location.

13 Claims, 5 Drawing Sheets

(51) Int. Cl.
  *G06Q 30/0601* (2023.01)
  *G06Q 20/32* (2012.01)
(52) U.S. Cl.
  CPC .......... *G06Q 20/326* (2020.05); *G06Q 30/06* (2013.01); *G06Q 30/0613* (2013.01); *G06Q 30/0621* (2013.01); *G06Q 30/0633* (2013.01); *G06Q 30/0637* (2013.01); *G06Q 30/0639* (2013.01); *G06Q 30/0641* (2013.01)
(58) Field of Classification Search
  USPC .......................................................... 705/21
  See application file for complete search history.

(56) References Cited

U.S. PATENT DOCUMENTS

| | | | | |
|---|---|---|---|---|
| 9,041,707 | B2* | 5/2015 | Ferrara | G06V 20/653 345/418 |
| 2004/0260607 | A1* | 12/2004 | Robbins | G06Q 20/20 705/14.32 |
| 2005/0203790 | A1* | 9/2005 | Cohen | G06Q 30/02 705/7.31 |
| 2008/0294996 | A1* | 11/2008 | Hunt | G06Q 30/02 707/999.102 |
| 2011/0295764 | A1 | 12/2011 | Cook et al. | |
| 2013/0076726 | A1 | 3/2013 | Ferrara et al. | |
| 2014/0067467 | A1* | 3/2014 | Rangarajan | G06Q 30/02 705/7.29 |
| 2015/0039410 | A1* | 2/2015 | Rone | G06Q 30/0222 705/14.23 |
| 2015/0074765 | A1* | 3/2015 | Haight | H04L 63/083 726/4 |
| 2015/0332242 | A1* | 11/2015 | Perry | G06Q 20/206 705/18 |
| 2016/0098790 | A1* | 4/2016 | Herman | G06F 40/169 705/39 |
| 2016/0247135 | A1* | 8/2016 | Miller | G06Q 20/20 |

OTHER PUBLICATIONS

Jun, Jinhyun. Understanding customers' healthful menu item selection behaviors at casual dining restaurants. Iowa State University ProQuest Dissertations Publishing, 2014. (Year: 2014).*

Myers, Allison Elizabeth. From media advocacy to health behaviors: Examining the relationships between mass media messages, public opinion, and point-of-sale tobacco control policy implementation in the United States. UNC at Chapel Hill. ProQuest Dissertations Publishing, 2016. (Year: 2016).*

Whyte, Gregor; Gendall, Philip; Hoek, Janet. Advancing the retail endgame: public perceptions of retail policy interventions. Tobacco Control; London vol. 23, Iss. 2, (Mar. 2014): 160. (Year: 2014).*

* cited by examiner

LOCATION BASED REGISTER RULES

CROSS-REFERENCE TO RELATED PATENT APPLICATIONS

This application is claims priority to U.S. Provisional Application No. 62/233,653 filed on Sep. 28, 2015, the content of each application is hereby incorporated by reference in its entirety.

BACKGROUND

Large retailers typically have geographically distributed store locations. Each store location may have different rules, regulations, warnings, statutes and laws governing sales of products in the stores. For example, multiple stores may lie in different states, cities, counties and towns. Each locality may have different regulations governing the sale of products in the stores. Point of Sale (POS) registers in the stores are programmed to reflect the regulations governing the sale of the products in the specific store to assist the cashier in completing the sale of the product.

BRIEF SUMMARY

Embodiments of the present invention described herein provide a system, method and computer readable medium for dynamically determining location-based rules affecting item sales at POS registers for a particular location and for distributing the location-based rules to the POS registers. More particularly, a location-based ruleset of rules regulating sales of items at an individual store is created and transmitted to the store along with a rule group to item map file that maps rules and warnings to individual store items. A rules engine at the store provides updated item sale rules and warnings to POS registers based on the location-based ruleset and the rule group to item map file. Embodiments thus provide an improved system for updating POS registers at different store locations with rules specific to the store location.

In one embodiment, a method for dynamically determining location-based rules affecting item sales at Point-of-Sale (POS) registers and for distributing the location-based rules to the POS registers includes retrieving location-based rules regulating sales of items in geographic locations. The method also creates a location-based ruleset for an individual retail store from the location-based rules based on a geographic location of the individual retail store and transmits the location-based ruleset to the individual retail store. The method further provides querying an item information database for item information for items in the individual retail store, receiving the item information and retrieving rule group information for the items in the individual retail store. The rule group information including rules and warnings associated with the sale of the items in the individual retail store. Additionally, the method creates a rule group to item map file for the individual retail store by mapping the rule group information to corresponding items in the individual retail store using the item information and transmits the rule group to item map file for the individual retail store to a Point-of-Sale (POS) Controller Server located in the individual retail store location. A rules engine executing on the POS Controller Server provides updated item sale rules for POS registers located in the individual retail store based on the location-based ruleset and the rule group to item map file.

In another embodiment, a non-transitory computer readable memory medium stores instructions for dynamically determining location-based rules affecting item sales at Point-of-Sale (POS) registers and for distributing the location-based rules to the POS registers. The instructions are executable to retrieve location-based rules regulating sales of items in multiple geographic locations. The instructions are further executable to create a location-based ruleset for an individual retail store from the location-based rules based on a geographic location of the individual retail store and transmit the location-based ruleset to the individual retail store. The instructions are also executable to query an item information database for item information for items in the individual retail store, receive the item information and retrieve rule group information for the items in the individual retail store. The rule group information includes rules and warnings associated with the sale of the items in the individual retail store. Additionally, the instructions are executable to create a rule group to item map file for the individual retail store by mapping the rule group information to corresponding items in the individual retail store using the item information transmit the rule group to item map file for the individual retail store to a Point-of-Sale (POS) Controller Server located in the individual retail store location. A rules engine executing on the POS Controller Server provides updated item sale rules for POS registers located in the individual retail store based on the location-based ruleset and the rule group to item map file In a further embodiment, a system for dynamically determining location-based rules affecting item sales at Point-of-Sale (POS) registers and for distributing the location-based rules to the POS registers includes one or more data storage devices. The data storage device includes a non-transitory computer-readable media storing a geographic-location rules database and an item information database holding item information for multiple retail stores. The system also includes a decision management center executed by one or more servers that is communicatively coupled to the one or more data storage devices. The decision management center is configured to query the geographic location rules database for geographic location-based rules regulating sales of items in different geographic locations and transmit, the geographic location-based rules to an extraction application. The system further includes a mapping application executed by one or more servers that is communicatively coupled to the one or more data storage devices. The mapping application is configured to query the item information database for item information for items in an individual retail store among multiple retail stores, receive the item information and, query the decision management center for rule group information for the items in the individual retail store. The rule group information including rules and warnings associated with the sale of the items in the individual retail store The mapping application is also configured to create a rule group to item map file for the individual retail store by mapping the rule group information to corresponding items in the individual retail store using the item information and to transmit the rule group to item map file for the individual retail store to a Point-of-Sale (POS) Controller Server located in the individual retail store. Additionally, the system includes an extraction application executed by one or more servers that is communicatively coupled to the one or more data storage devices. The extraction application is configured to receive the location-based rules from the decision management center, create a location-based ruleset for the individual retail store from the location-based rules based on the geographic location of the retail store and transmit the location-based ruleset for the individual retail store to the POS Controller Server located in the individual retail store. A rules engine executed by the POS Controller Server provides updated item sale rules for POS registers located in the individual store based on the location-based ruleset and the rule group to item map file.

In an embodiment, a system for identifying and applying location-based rules on transactions conducted at Point of Sale (POS) registers includes a Point of Sale (POS) Controller Server that receives a location-based ruleset regulating sales of items in a geographic location that includes an individual retail store and a rule group to item map file for the individual retail store that maps rule group information to corresponding item information. The rule group information including rules and warnings associated with the sale of the items in the individual retail store The system also includes an optical-machine reader configured to read optical machine readable identifiers. The optical-machine reader scans an identifier of an item to be purchased. The system further includes a POS register operatively coupled to the optical-machine reader to receive the identifier of the item to be purchased, the POS register including a computer processor and a memory, the computer processor being in communication with the POS Controller Server. The identifier of the item to be purchased is forwarded to the POS Controller Server. Additionally, the system includes a rules engine executing on the POS Controller Server that is configured to. receive the identifier, identify rules applicable to the sale of the item to be purchased based on the location-based ruleset, the rule group to item map file and the identifier, and to transmit rules associated with the sale of the item to be purchased to the POS register.

BRIEF DESCRIPTION OF THE DRAWINGS

The accompanying drawings, which are incorporated in and constitute a part of this specification, illustrate one or more embodiments of the invention and, together with the description, help to explain the invention. Illustrative embodiments are shown by way of example in the accompanying drawings and should not be considered as a limitation of the present invention. In the drawings.

DETAILED DESCRIPTION

Described in detail herein are methods, systems, and computer-readable media associated with determining location-based rules and warnings for item sales at POS registers for a particular location and for distributing those location-based rules and warnings to the POS registers. In one embodiment, a location-based ruleset of rules regulating sales of items at an individual store is created and transmitted to the store. Item information for a particular store is retrieved as is rule group information associated with the items. Rule group information is mapped to corresponding items in the individual store. The rule group information includes rules and warnings associated with the sale of the items in the individual retail store. The mapped information is embodied in a rule group to item map file that is also transmitted to the store. In response to items being scanned at a POS register, a rules engine executing in the store provides updated item sale rules to the POS register using both the location-based ruleset and rule group to item map file.

In one exemplary embodiment, execution of an automated batch file may trigger execution of a decision management center application by a processor. The decision management center may query one or more databases to retrieve geographic location-based rules Different location-based rules may govern the sale of products in different specific locations. For example, the rules may include, but are not limited to, health warnings related to specific items in certain geographic locations, updated guidelines related to specific items in certain geographic locations; and updated store regulations related to specific items sold in certain geographic locations. The decision management center may create a single file containing the retrieved geographic-location based rules for all store locations and transmit the file to an extraction application for further processing. In one embodiment, the decision management center may only query the databases for any rules that have been created or updated since a previously run query.

In this exemplary embodiment, upon receiving the location-based rules file from the decision management center, the extraction application may be executed by a processor. The extraction application creates a specific location-based ruleset file for each store location containing geographic location-based rules for the items sold at the specific store locations. The extraction application transmits the respective location-based ruleset files to each individual store location.

Also in this exemplary embodiment, the execution of the automated batch file may also trigger execution of a mapping application by a processor. The mapping application may query one or more databases for item information and the decision management center for rule group information that includes rules and warnings affecting the sale of individual items. The mapping application may map the rule group information and the item information specific for each store location to create separate rule group to item map files for each store. The rule group information may include, but is not limited to, health warnings related to specific items, updated guidelines related to specific items; and updated store regulations related to specific items. In one embodiment, the mapping application may only query the databases for any rule group information and item information that is new or has been updated since a previously run query. The mapping application transmits each individual rule group to item map file to the respective specific store locations.

Further in this exemplary embodiment, at the individual retail store location, the two received files, the location-based ruleset and the rule group to item map file, are used as input by a rules engine to update sales occurring at POS registers in the store. For example, the rules engine may execute on a POS controller server and receive an item ID for an item being scanned at a POS register in the store. The item ID is provided to the rules engine which retrieves appropriate rules for the item being sold using both the location-based ruleset and rule group to item map file and provides the rules regulating the sale to the POS register in real-time. In this manner both item rules and warnings from the rule group to item map file and geographic location-based rules from the location-based ruleset can be provided dynamically to the POS register.

Figure 1:
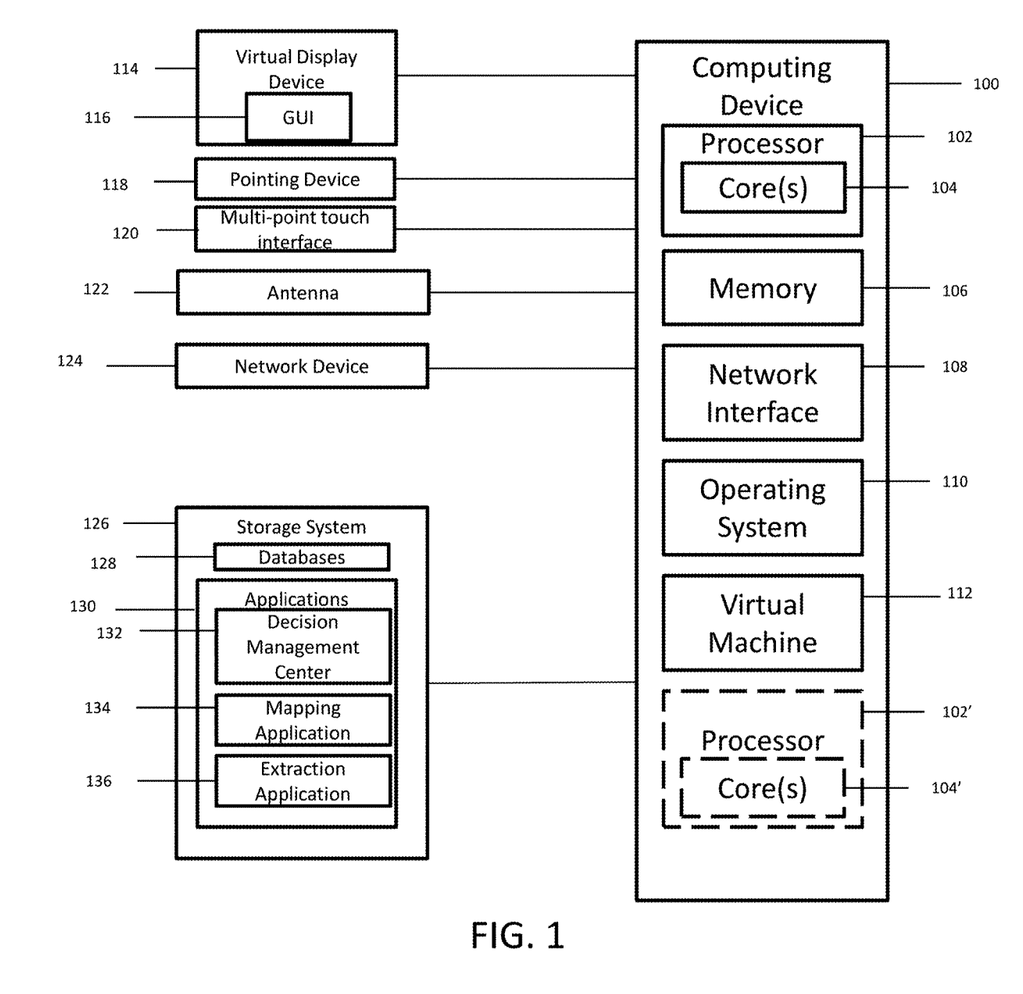
FIG. 1 is a block diagram depicting an exemplary computing device suitable for use in an embodiment of the present invention.

FIG. 1 is a block diagram depicting an exemplary computing device suitable for use in an embodiment of the present invention. Computing device 100 may include processor 102 which includes one or more cores 104. Computing device 100 may also include one or more storage devices 126, such as a hard-drive, CD-ROM, or other computer readable media, for storing data and computer-readable instructions and/or software (e.g., applications 130 including decision management center application 132, mapping application 134, and extraction application 136). In one embodiment, execution of decision management center 132 by processor 102 can result in the querying of databases 128 holding geographic location-based rules that regulate sales of items in multiple geographic locations and the transmittal of those rules to extraction application 136. The execution of the mapping application 134 by the processor 102 can facilitate retrieving and mapping rule group information and item information for an individual store to create a rule group to item map file. The execution of the extraction application 136 can result in creating individual geographic location-based ruleset files for each store based on the retrieved location-based rules. Exemplary storage device 126 may also store one or more databases 128 for storing any suitable information required to implement exemplary embodiments. For example, exemplary storage device 126 can include one or more databases 128 for storing information, such as item information, geographic location-based rules and rule group information that includes item rules and warnings. The databases 128 may be updated manually or automatically at any suitable time to add, delete, and/or update information in the databases.

Computing device 100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 106 included in the computing device 100 may store computer-readable and computer-executable instructions or software (e.g., applications) for implementing exemplary operations of computing device 100. As noted above, computing device 100 also includes configurable and/or programmable processor 102 and associated core(s) 104. Optionally, computing device 100 may include one or more additional configurable and/or programmable processor(s) 102' and associated core(s) 104' (for example, in the case of computer systems having multiple processors/cores), for executing computer-readable and computer-executable instructions or software stored in memory 106 and other programs for implementing exemplary embodiments of the present invention. Processor 102 and processor(s) 102' may each be a single core processor or multiple core (104 and 204') processor.

Virtualization may be employed in the computing system 100 so that infrastructure and resources in the computing device 100 may be shared dynamically. Virtual machine 112 may be provided to handle a process running on multiple processors so that the process appears to be using only one computing resource rather than multiple computing resources. Multiple virtual machines may also be used with one processor.

Memory 106 may include a computer system memory or random access memory, such as DRAM, SRAM, EDO RAM, and the like. Memory 106 may include other types of memory as well, or combinations thereof.

A user may interact with computing device 100 through a visual display device 114, such as a computer monitor, which may display one or more graphical user interfaces 116, multi touch interface 120, and be accessible via pointing device 118.

Computing device 100 can include network interface 108 configured to interface via one or more network devices 124 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, computing device 100 can include one or more antennas 122 to facilitate wireless communication (e.g., via the network interface) between computing device 100 and a network. Network interface 108 may include a built-in network adapter, network interface card, PCMCIA network card, card bus network adapter, wireless network adapter, USB network adapter, modem or any other device suitable for interfacing computing device 100 to any type of network capable of communication and performing the operations described herein.

Computing device 100 may run any operating system 110, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on computing device 100 and performing the operations described herein. In exemplary embodiments, operating system 110 may be run in native mode or emulated mode. In an exemplary embodiment, operating system 110 may be run on one or more cloud machine instances.

Figure 2:
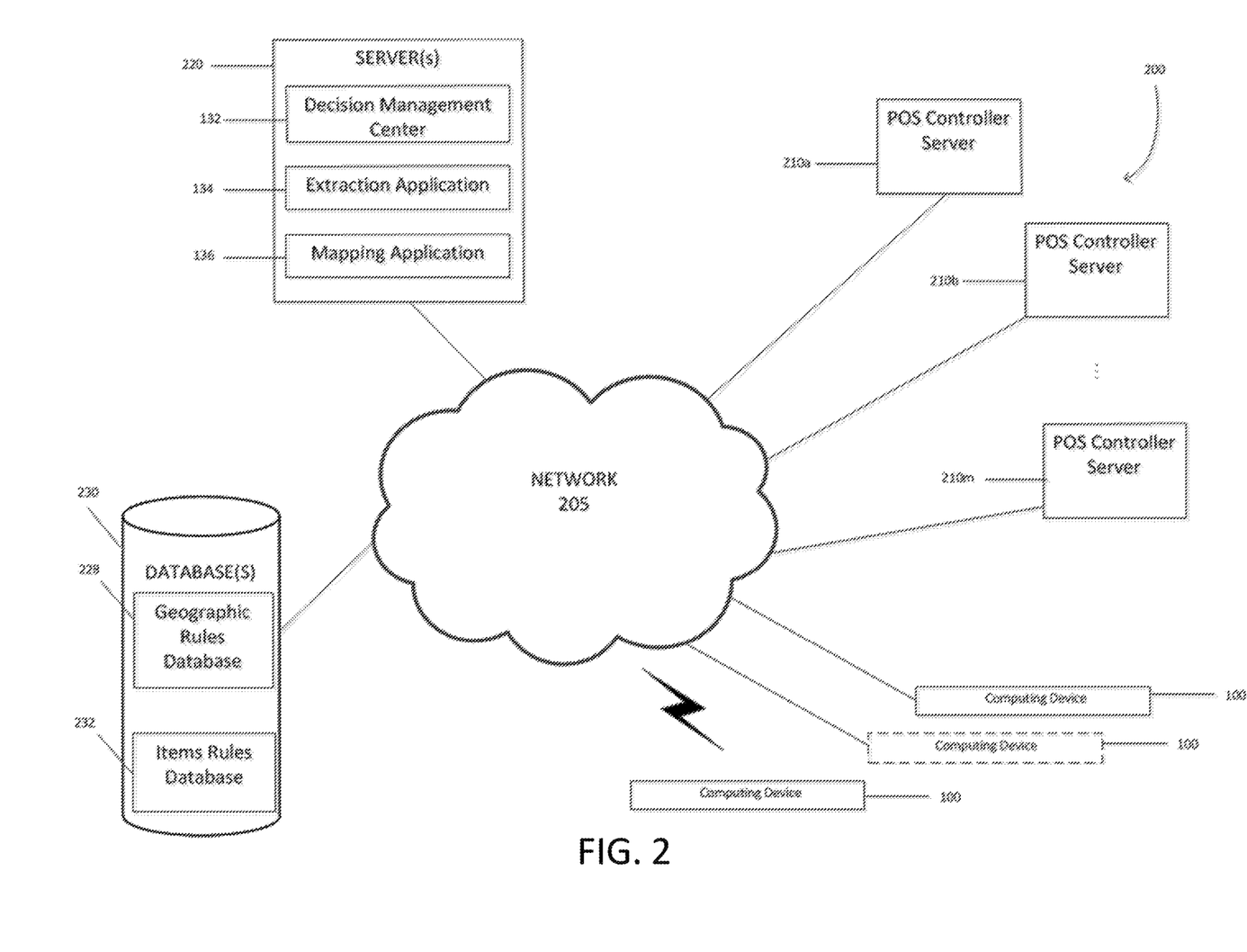
FIG. 2 illustrates an exemplary distributed environment including computing devices in communication with each other via a communications network in accordance with an embodiment of the present invention.

FIG. 2 illustrates an exemplary distributed environment including computing devices in communication with each other via a communications network in accordance with an embodiment of the present invention. More particularly, FIG. 2 illustrates a distributed computing system 200 including servers 220, computing device 100, POS Controller Servers 210a-m and database(s) 230 in communication with each other via a communications network 205. In exemplary embodiments, decision management center 132, mapping application 134, and extraction application 136 can be stored, accessed, and/or executed on the servers 220 and the computing device 100. To maintain distributed computing system 200 one or more servers 220 can be configured to execute an embodiments of the decision management center 132, mapping application 134, and extraction application 136 to implement embodiments of a maintenance process as described herein.

In an example embodiment, one or more portions of network 205 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In one embodiment computing device 100 can be implemented as depicted in FIG. 1 or with some variation (e.g., with or without the applications 132, 134 and 136 or portions thereof) and may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, smartphones, tablets, netbooks, and the like. While server 220 has been described as being configured with the decision management center 132, in some embodiments, computing device 100 may be configured with decision management center 132, or portions thereof and may look up geographic-location based rules, create a file containing the geographic-location based rules for all store locations, and transmit the file containing all the geographic-location based rules for all the stores to extraction application 136. Furthermore, in exemplary embodiments Computing device 100 can be configured with the mapping application 134 or portions thereof, e.g., to map the item rules and warnings to item information to create a single file containing the mapped rules for each individual store location, and to transmit the respective file to each individual store location. Furthermore, in exemplary embodiments computing device 100 can be configured with extraction application 136 or portions thereof, to receive the geographic-location based rules from the decision management center 134, create single location-based ruleset files for each individual store location containing the respective geographic-location based rules, and transmit the respective location-based ruleset to each individual store location. Computing device 100 can include more or fewer components than the computing device 100 shown in FIG. 1.

Computing device 100 may connect to network 205 via a wired or wireless connection and may include one or more applications or systems In some embodiments, computing device 100 can include a client side application, such as a web browser (and/or a program specific to the applications 132, 134 and/or 136), that allows computing device 100 to communicate and interact with applications (e.g., applications 132, 134 and/or 136) hosted by the server 220.

POS Controller Servers 210a-m may connect to network 205 via a wired or wireless connection. POS Controller Servers 210a-m may include one or more applications or systems such as, but not limited to, a sales transaction application, a cashier performance application, a customer review application, a user interface application, a checkout lane parameter system, and the like. In an example embodiment, POS Controller Servers 210a-m may perform all the functionalities described herein.

In exemplary embodiments, the POS Controller Servers 210a-m may each be located at an individual store location and may retrieve and apply the rules corresponding to items intended for purchase at POS registers. For example, in exemplary embodiments, a POS Controller server located at a store location may receive the geographic-location based rules file from the extraction application 136 and the rule group to item map file that maps item rules and warnings to store items from the mapping application 134. For example, upon the scanning of an item at the at the POS register using an optical-machine reader the POS Controller Server may be configured to search the files and retrieve any item or geographic location-based rules corresponding to the scanned item. In exemplary embodiments, the POS Controller Server may transmit any retrieved rules to the POS register.

Database 230 may store information/data, as described herein. For example, the database 230 may include a geographic rules database 228 and items rules database 232. In exemplary embodiments, The geographic rules database 228 may include rules governing the sale of items in specific geographic locations for multiple stores. In exemplary embodiments, the items rules database 232 may include rules and warnings governing the sale of items in multiple store locations.

In some embodiments, the database(s) 230 may be included within server 220.

Figure 3:
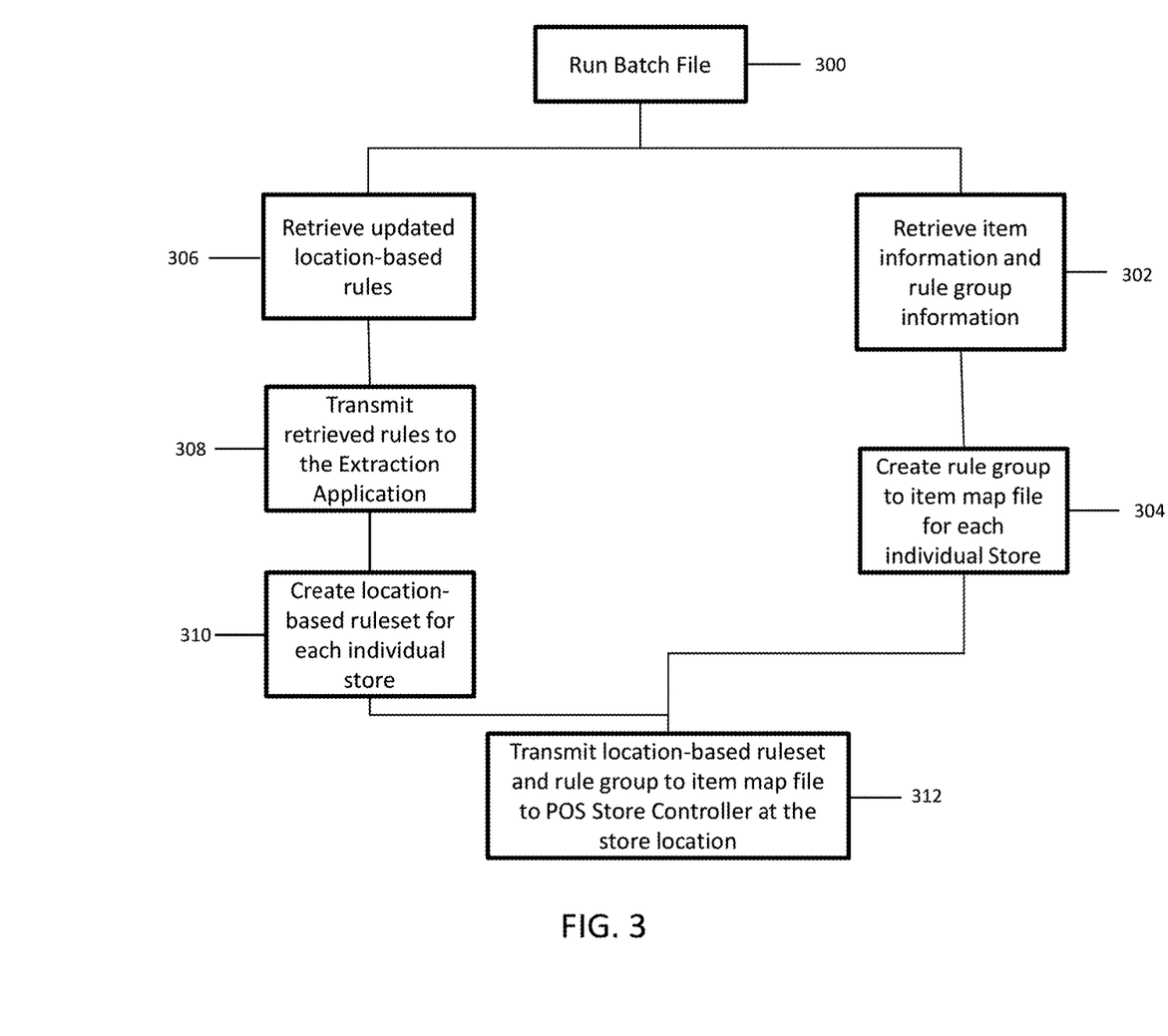
FIG. 3 is a flowchart illustrating an exemplary sequence of steps for creating and transmitting a location-based ruleset and rule group to item map file to a POS controller server located in an individual retail store in an embodiment of the present invention.

FIG. 3 is a flowchart illustrating an exemplary sequence of steps for creating and transmitting a location-based ruleset and rule group to item map file to a POS controller server located in an individual retail store in an embodiment of the present invention. The sequence begins with execution of an automated batch file (step 300). The batch file may be executed based on a pre-determined time period. For example, the batch file may be executed daily, monthly, bi-annually, or annually. In other embodiments, the batch file may be executed manually. In exemplary embodiments the batch file may be but is not limited to .bat, .cmd or .btm. In other embodiments the batch file may be a script file. In exemplary embodiments, the batch file may trigger execution of decision management center application 132 and mapping application 134.

Upon execution of mapping application 134, d items database 232 is queried for rule group information that includes item rules and warnings/updated item rules and warnings regulating sale of store items (step 302). Mapping application 134 maps the rule group information to the corresponding items using item information retrieved from an item information database (step 304). In exemplary embodiments, rules may include, but are not limited to, health warnings related to specific items, updated guidelines related to specific items; and updated store regulations related to specific items. In exemplary embodiments, mapping application 134 creates one rule group to item map file for each store location including the mapped rules specific for the items sold in a particular store location. Upon execution of decision management center application 132, decision management center queries geographic rules database 228 for the location-based rules/updated location-based rules for all the store locations (step 306). In exemplary embodiments, rules may include, but are not limited to, health warnings related to specific items in certain geographic locations, updated guidelines related to specific items in certain geographic locations; and updated store regulations related to specific items sold in certain geographic locations. In exemplary embodiments, decision management center 132 may only retrieve the location-based rules that have changed since the last query run by decision management center 132. Decision management center 132 then transmits the retrieved location-based rules for all the store locations to extraction application 136.

Upon receiving the location-based rules from decision management center 132, extraction application 136 may create single location-based ruleset files for each store location that include all the location-based rules specific to the store location (step 308). For example, one location-based ruleset may be created for each store location and each file may include rules specific to the store's geographic location.

The location-based ruleset and rule group to item map file are transmitted to each store (step 312). In one embodiment, mapping application 134 may transmit the rule group to item map file to a POS controller located in the store location. In an embodiment extraction application 136 may transmit the location-based ruleset to the same POS controller located in the store location.

Figure 4:
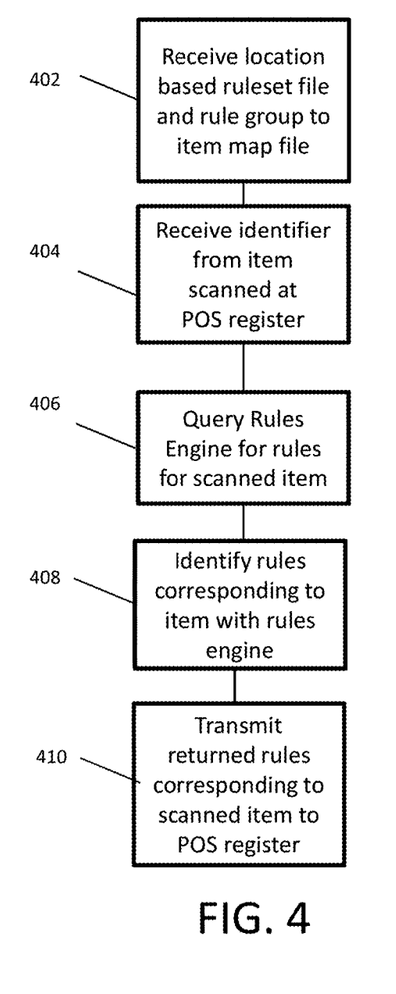
FIG. 4 is a flowchart illustrating an exemplary sequence of steps executed by the POS controller server to transmit rules for item sales to POS registers in an embodiment of the present invention.

FIG. 4 is a flowchart illustrating an exemplary sequence of steps executed by the POS controller server to transmit rules for item sales to POS registers in an embodiment of the present invention The sequence begins with a POS controller server receiving the location-based ruleset and the rule group to item map item file (step 402). As noted previously, in exemplary embodiments the files include rules specific to the geographic location of the store and rules and warning specific to the items sold at the store.

Subsequently, the POS controller server receives an identifier for an item being scanned at a POS register in the store location (step 404). For example, the item may be scanned at the POS register using an optical scanner or scanning gun and the identifier transmitted over a store network to the POS controller server. In exemplary embodiments, an optical machine readable representation labeled on the item is scanned and is encoded with an item identifier that the optical scanner 528 or scanning gun 530 decode to retrieve the identifier.

The POS controller server, upon receiving the identifier, queries a the rules engine (step 406). The rules engine is executed uses the identifier and the location-based ruleset and rule group to item map file to identify rules and/or warnings associated with the just scanned item (step 408).

The rules engine transmits the identified rules corresponding to the scanned item to the POS register at which the item was scanned. In one embodiment, the identified rules are displayed on a display of the POS register. For example, on a cashier operated POS register, the rules may be displayed only viewable to the cashier. In another embodiment, on a self-service register, the rules may be displayed on a display viewable to the customer/user. In exemplary embodiments, the rules may be applied at the POS register. For example, in exemplary embodiments, if the corresponding rule requires an age restriction, the POS register may block the purchase until the birth date of the customer is entered by authorized personnel. In other embodiments, the rules may just be displayed as warnings and not affect the purchase of the item.

Although the description herein has described the separate delivery of the location-based ruleset and the rule group to item map file to the individual store locations, it should be appreciated that in an alternate embodiment, the two files may be created as described above but then combined into a single file before being transmitted to the individual store location for use by the rules engine. Similarly, although the description contained herein has mentioned a POS controller server as receiving the location-based ruleset and rule group to item map file at the store location, other computer processes in the individual store locations could be utilized in place of a POS controller server without departing from the scope of the present invention.

Figure 5:
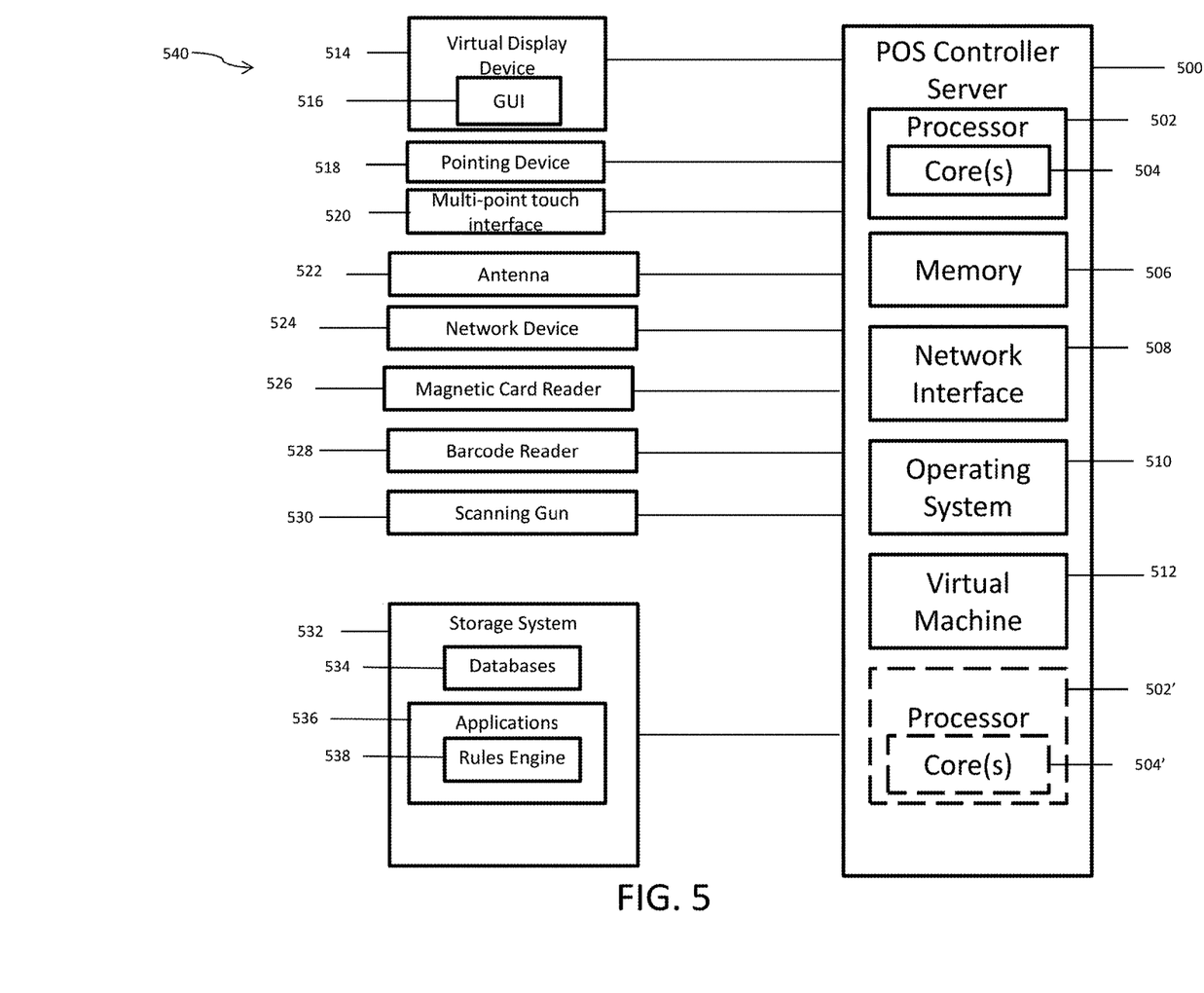
FIG. 5 is a block diagram depicting an exemplary POS register that includes a POS controller server in accordance with an embodiment of the present invention.

FIG. 5 is a block diagram depicting an exemplary POS register that includes a POS controller server in accordance with an embodiment of the present invention. POS controller server 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 506 included in the POS controller server 500 may store computer-readable and computer-executable instructions or software for implementing exemplary operations of the POS register 540. The POS controller server 500 also includes configurable and/or programmable processor 502 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in memory 506 and other programs for controlling register components operatively coupled to POS controller 500. Processor 502 and processor(s) 502' may each be a single core processor or multiple core (504 and 504') processor.

Virtualization may be employed in POS controller server 500 so that infrastructure and resources in the POS controller server may be shared dynamically. Virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 306 may include other types of memory as well, or combinations thereof.

A user (e.g., a cashier) may interact with POS controller server 500 through components of POS register 540 that are operatively coupled to POS controller 500 including, visual display device 514, such as a computer monitor, which may display one or more graphical user interfaces 516. POS controller server 500 may include other I/O devices for receiving input from a user, for example, card reader 526, optical scanner 528, and scan gun 530, as described herein. POS controller 500 may include other suitable I/O peripherals.

Card reader 526 may be a magnetic card reader configured to read encoded information from magnetic stripes of payment cards. The magnetic reader may decode the encoded information and transmit the decoded information to POS controller server 500, or may in the alternative, transmit the encoded information to POS controller server 500, which may decode the encoded information. A customer or cashier may use the card reader to input tender information into POS register 540 to complete a purchase of one or more items by the customer. In example, embodiments, the card reader can include one or more microcontrollers and can execute reader firmware to implement one or more functions carried out by card reader 526. While an example embodiment has been illustrated as including a magnetic card reader, those skilled in the art will recognize that other types of readers can be utilized instead of, or in addition to, the magnetic card reader. For example, in example embodiments, the cars reader can include near field communication (NFC) or Radio Frequency Identification (RFID) reader capability to wireless interact with a customer's payment type.

Optical scanner 528 may be a barcode scanning machine configured to read optical machine-readable representations. Optical scanner 528 can be configured to scan encoded information from machine-readable representations. Optical scanner 528 may decode the encoded information and transmit the decoded information to POS controller server 500, or may in the alternative, transmit the encoded information to POS controller server 500, which may decode the encoded information. A customer or cashier may use optical scanner 528 to input item and/or loyalty/reward information into POS register 540 for use when processing a transaction for the customer. For example, optical scanner 528 can be configured to scan barcodes or QR codes associated with items to be purchased by a customer and/or can scan customer loyalty/rewards cards/tags.

Scan gun 530 may be a handheld optical scanning machine configured to read optical readable representations labeled on the products intended to be purchased. Scan gun 530 may be semi-portable where users can hold the scan gun and scan optical readable representations labeled on products without placing the products on POS register 540. Scan gun 530 can be configured to scan encoded information from machine-readable representations. Scanning gun 530 may decode the encoded information and transmit the decoded information to the POS controller, or may in the alternative, transmit the encoded information to the POS controller, which may decode the encoded information. Scan gun 530 can be used to input item and/or loyalty/reward information into POS register 540 for use when processing a transaction for the customer. For example, scan gun 530 can be configured to scan barcodes or QR codes associated with items to be purchased by a customer and/or can scan customer loyalty/rewards cards/tags.

POS controller server 500 may also include one or more storage devices 532, such as a hard-drive, CD-ROM, or other computer readable media, for storing data and computer-readable instructions and/or software that implement exemplary of POS register 540 (e.g., applications 536 including rules engine 538). The execution of rules engine 538 by processor 502 can facilitate applying the received rules on products intended for purchase. Exemplary storage device 532 may also store one or more databases for storing any suitable information required to implement exemplary embodiments. For example, exemplary storage device 532 can store one or more databases 534 for storing information such as transaction information, cashier information, product information, and/or any other suitable information. The databases may be updated manually or automatically at any suitable time to add, delete, and/or update one or more data items in the databases.

POS controller server 500 can include network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 522 to facilitate wireless communication (e.g., via the network interface) between POS controller 500 and a network. Network interface 508 may include a built-in network adapter, network interface card, PCMCIA network card, card bus network adapter, wireless network adapter, USB network adapter, modem or any other device suitable for interfacing POS controller 500 to any type of network capable of communication and performing the operations described herein.

POS controller server 500 may run any operating system 510, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the POS controller and performing the operations described herein. In exemplary embodiments, operating system 510 may be run in native mode or emulated mode. In an exemplary embodiment, operating system 510 may be run on one or more cloud machine instances.

In exemplary embodiments, upon scanning an identifier of an item at POS register 540 using optical reader 528 or scanning gun 530, rules engine 538 may be executed by processor 502. In exemplary embodiments, upon execution, rules engine 538 may receive an item identifier from POS register 540. In exemplary embodiments rules engine 538 may look up location-based rules and item based rules corresponding to the scanned item using the received identifier. In exemplary embodiments, the identifier may be encoded in an optical machine readable representation labeled on an item. In exemplary embodiments, the optical machine readable representation may be decoded by POS register 540. In other embodiments the optical machine readable representation may be decoded by rules engine 538. In exemplary embodiments, rules engine 538 may transmit the rules corresponding to the scanned item to POS register 540.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

Various modifications to the example embodiments described herein will be readily apparent to those skilled in the art, and the generic principles defined herein may be applied to other embodiments and applications without departing from the spirit and scope of the invention. Moreover, in the above description, numerous details are set forth for the purpose of explanation. However, one of ordinary skill in the art will realize that embodiments of the present invention may be practiced without the use of these specific details. In other instances, well-known structures and processes are shown in block diagram form in order not to obscure the description of example embodiments with unnecessary detail. Thus, the present invention is not intended to be limited to the embodiments shown, but is to be accorded the widest scope consistent with the principles and features disclosed herein.

What is claimed is:

1. A computing device-implemented method for dynamically determining location-based rules affecting item sales at Point-of-Sale (POS) registers and for distributing the location-based rules to the POS registers, the computing device including one or more processors, the method comprising:

querying one or more databases to retrieve location-based rules regulating sales of items via POS registers in a plurality of retail stores in a plurality of geographic locations, the location-based rules including one or more of health warnings related to specific items in certain geographic store locations, updated guidelines related to specific items in certain geographic locations, and updated store regulations related to specific items sold in certain geographic store locations, wherein each retail store of the plurality of retail stores comprises multiple POS registers, of the POS registers, and each POS register is configured to enable completion of sales transactions of one or more items at the respective one of the plurality of retail stores;

creating a location-based ruleset file for each of the plurality of geographic locations comprising the respective location based rules for the items sold at respective one or more of the plurality of the retail stores, wherein a location-based ruleset of the location-based ruleset file comprises one or more of age restrictions on purchasing items, health warnings on items in a geographic-specific location, and/or rules of sale in the respective retail store based on a specific geographic location of the respective retail store;

querying, using a mapping application, an item information database for item information for items sold in each retail store of the plurality of retail stores, the item information received in response to the query;

retrieving, using the mapping application, rule group information associated with the sale of the items sold in each retail store among the plurality of retail stores, the rule group information including one or more of health warnings and/or usage restrictions associated with the sales of the items through respective one or more of the retail stores in certain geographic store locations;

creating, using the mapping application, a rule group to item map file for each retail store of the plurality of retail stores, wherein each of the rule group to item map files corresponds to the respective geographic store location and defines a mapping of associations between one or more of the rule group information to each item of a set of items of the items sold in the respective retail store using the item information;

transmitting the respective rule group to item map file to Point-of-Sale (POS) Controller Servers each located in and associated with a respective one of the plurality of retail stores;

transmitting the respective location-based ruleset files to the one or more Point-of-Sale (POS) Controller Servers;

receiving as input, by a rules engine executing through a first POS Controller Server of the POS Controller Servers located in a first individual retail store of the plurality of retail stores, a first location-based ruleset file and a first rule group to item map file associated with the first individual retail store to update sales occurring through POS registers located in the first individual retail store; and receiving, by the rules engine executing through the first POS Controller Server from an optical scanner or scanning gun, an item identifier for an item scanned and decoded by the optical scanner or scanning gun at a POS register located in the first individual retail store, transmitting the item identifier captured by the optical scanner or scanning gun to the first POS Controller Server via a communications network;

in response to the item being scanned at the POS register, automatically retrieving, using the rules engine, a first item sale rule as defined within the rule group to item map file based on the location of the first individual retail store and defining an association of the first item sale rule to the item identifier, and regulating a sale of the item associated with the item identifier using the location-based ruleset and the first item sale rule from the rule group to item map file; and automatically providing, using the rules engine and in response to the item being scanned, at least the first item sale rule regulating the sale of the item to the POS register in real-time and controlling the POS register whereupon the POS register automatically applies the first item sale rule to the sale of the item comprising blocking the sale of the item until confirmation that the first item sale rule is satisfied.

2. The method of claim 1 wherein a batch file is executed periodically to trigger the transmitting of the location-based ruleset and rule group to item map file to the first individual retail store based on a predetermined time period.

3. The method of claim 1 wherein the POS registers include at least one of a cashier-controller register or a self-service register.

4. The method of claim 1, further comprising displaying one or more of the item sale rules on a display of the POS register.

5. The method of claim 1, wherein the location-based ruleset and rule group to item map file are combined into a single file before being transmitted to the first POS Controller Server for use by the rules engine.

6. The method of claim 1, wherein the querying the one or more databases to retrieve the location-based rules regulating sales of items via the POS registers comprises retrieving only the location-based rules that have changed since a last query to retrieve the location-based rules for the first individual retail store.

7. The method of claim 1, wherein the first POS Controller Server is located at the first individual retail store.

8. A non-transitory computer readable memory medium storing instructions for dynamically determining location-based rules affecting item sales at Point-of-Sale (POS) registers and for distributing the location-based rules to the POS registers, wherein the instructions are executable by a processor to:

retrieve location-based rules regulating sales of items via POS registers in a plurality of retail stores at different geographic store locations, the location based rules including one or more of health warnings related to specific items in certain geographic store locations, updated guidelines related to specific items in certain geographic store locations, and updated store regulations related to specific items sold in certain geographic store locations, wherein each retail store of the plurality of retail stores comprises multiple POS registers, of the
POS registers, and each POS register is configured to
enable completion of sales transactions of one or more
items at the respective one of the plurality of retail
stores;

create a location-based ruleset file for each of the plurality
of geographic locations comprising one or more of the
respective location-based rules for the items sold at
respective one or more of the plurality of retail stores,
wherein a location-based ruleset of the location-based
ruleset file comprises one or more of age restrictions on
purchasing items, health warnings on items in a geographic-specific location and/or rules of sale in the
respective retail store based on a specific geographic
location of the respective retail store;

query an item information database for item information
for items sold in each retail store of the plurality of
retail stores, the item information received in response
to the query;

retrieve rule group information for the items sold in each
retail store among the plurality of retail stores, the rule
group information including one or more of health
warnings and/or usage restrictions associated with the
sales of the items through respective one or more of the
retail stores in certain geographic store locations;

create a rule group to item map file for each retail store of
the plurality of retail stores, wherein each of the rule
group to item map files corresponds to the respective
geographic store location and defines a mapping of
associations between one or more of the rule group
information to each item of a set of items of the items
sold in the retail store using the item information;

transmit the respective rule group to item map files to
Point-of-Sale (POS) Controller Servers each located in
and associated with a respective one of the plurality of
retail stores;

transmit the respective location-based ruleset files to the
Point-of-Sale (POS) Controller Servers;

receive as input, by a rules engine executing through a
first POS Controller Server of the POS Controller
Servers located in a first individual retail store of the
plurality of retail stores, a first location-based ruleset
file and a first rule group to item map file associated
with the first individual retail store to update sales
occurring at POS registers located in the first individual
retail store;

receive, by the rules engine executing on the POS Controller Server from an optical scanner or scanning gun,
an item identifier for an item scanned and decoded by
the optical scanner or scanning gun at a POS register
located in the first individual retail store, transmit the
item identifier captured by the optical scanner or scanning gun to the first POS Controller Server via a
communications network;

in response to the item being scanned at the POS register,
automatically retrieve, using the rules engine, a first
item sale rule as defined within the rule group to item
map file based on the location of the first individual
retail store and defining an association of the first item
sale rule to the item identifier, and regulating a sale of
the item associated with the item identifier using the
location-based ruleset and the first item sale rule from
the rule group to item map file; and automatically provide, using the rules engine and in
response to the item being scanned, at least the first
item sale rule regulating the sale of the item to the POS
register in real-time and controlling the POS register
whereupon the POS register automatically applies the
first item sale rule to the sale of the item comprising
blocking the sale of the item until confirmation that the
first item sale rule is satisfied.

9. The medium of claim 8 wherein the batch file is executed periodically to trigger the transmitting of the location-based ruleset and rule group to item map file to the first individual retail store based on a predetermined time period.

10. The medium of claim 8 wherein the POS registers include at least one of a cashier-controller register or a self-service register.

11. A system for dynamically determining location-based rules affecting item sales at Point-of-Sale (POS) registers and for distributing the location-based rules to the POS registers, the system comprising:

one or more data storage devices including a non-transitory computer-readable media storing:

a geographic-location rules database storing geographic location-based rules regulating sales of items
via POS registers in a plurality of retail stores in a
plurality of geographic store locations, the locationbased rules including one or more of health warnings
related to specific items in certain geographic store
locations, updated guidelines related to specific
items in certain geographic store locations, and
updated store regulations related to specific items
sold in certain geographic store locations, wherein
each retail store of the plurality of retail stores
comprises multiple POS registers, of the POS registers, and each POS register is configured to enable
completion of sales transactions of one or more items
at the respective one of the plurality of retail stores,
and an item information database holding item information
for a plurality of retail stores;

a decision management center executed by one or more
servers, the decision management center communicatively coupled to the one or more data storage devices
and configured to:

query the geographic location rules database for the
geographic location-based rules regulating sales of
items via POS registers in one or more retail stores
of the plurality of retail stores, wherein different
location-based rules governing the sale of items in
different specific geographic store locations, and transmit, to an extraction application, the geographic
location-based rules;

a mapping application executed by one or more servers,
the mapping application communicatively coupled to
the one or more data storage devices and configured to:

query the item information database for item information for items sold in each retail store among the
plurality of retail stores, query the decision management center for rule group
information associated with the sale of the items sold
in each retail store among the plurality of retail
stores, the rule group information including one or
more of health warnings and/or usage restrictions
associated with the sales of the items through respective one or more of the retail stores in certain
geographic store locations, create a rule group to item map file for each retail store
of the plurality of retail stores, wherein each of the
rule group to item map files corresponds to the
respective geographic store location and defines a
mapping of associations between one or more of the rule group information to each item of a set of items of the items sold in the respective retail store using the item information, and transmit the respective rule group to item map files to Point-of-Sale (POS) Controller Servers; and an extraction application executed by one or more servers, the extraction application communicatively coupled to the one or more data storage devices and configured to:

receive the location-based rules from the decision management center, create a location-based ruleset file for each store location comprising one or more of the respective geographic-location based rules for the items sold at the respective one or more of the plurality of retail stores, wherein a location-based ruleset of the location-based ruleset file comprises one or more of age restrictions on purchasing items, health warnings on items in a geographic-specific location and/or rules of sale in the respective retail store based on a specific geographic location, transmit the respective location-based ruleset files to the POS Controller Servers; and an optical scanner or scanning gun at a POS register located in a first individual retail store, the optical scanner or scanning gun configured to:

scan an optical machine readable representation encoded with an item identifier and labeled on an item, and decode the item identifier and transmit the item identifier over a store network to a first POS Controller Server of the POS Controller Servers; and a rules engine executing through the first POS Controller Server located in the first individual retail store configured to:

receive as input a first location-based ruleset file and a first rule group to item map file associated with the first individual retail store to update sales occurring at POS registers located in the first individual retail store, receive the item identifier for the item scanned at the POS register located in the first individual retail store, in response to the item being scanned at the POS register, automatically retrieve a first item sale rule as defined within the rule group to item map file based on the location of the first individual retail store and defining an association of the first item sale rule to the item identifier, and regulating a sale of the item associated with the item identifier using the location-based ruleset and the first item sale rule from the rule group to item map file, and automatically provide, in response to the item being scanned, at least the first item sale rule regulating the sale of the item to the POS register in real-time and controlling the POS register whereupon the POS register automatically applies the item sale rules to the sale of the item comprising blocking the sale of the item until confirmation that the item sale rules regulating the sale of the item are satisfied.

12. The system of claim 11 wherein a batch file is executed periodically to trigger the transmitting of the location-based ruleset and rule group to item map file to the first individual retail store based on a predetermined time period.

13. The system of claim 11 wherein the POS registers include at least one of a cashier-controller register or a self-service register.

* * * * *

UNITED STATES PATENT AND TRADEMARK OFFICE
CERTIFICATE OF CORRECTION

PATENT NO. : 11,710,113 B2
APPLICATION NO. : 15/277138
DATED : July 25, 2023
INVENTOR(S) : Shuvro Chakrobartty et al.

It is certified that error appears in the above-identified patent and that said Letters Patent is hereby corrected as shown below:

In the Claims

Column 14, Claim 2, Line 31, delete "claim 1" and insert --claim 1,--.

Column 14, Claim 3, Line 35, delete "claim 1" and insert --claim 1,--.

Column 16, Claim 9, Line 5, delete "claim 8" and insert --claim 8,--.

Column 16, Claim 9, Line 5, delete "the batch file" and insert --a batch file--.

Column 16, Claim 10, Line 10, delete "claim 8" and insert --claim 8,--.

Column 18, Claim 12, Line 26, delete "claim 11" and insert --claim 11,--.

Column 18, Claim 13, Line 31, delete "claim 11" and insert --claim 11,--.

Signed and Sealed this
Twenty-fourth Day of October, 2023

Katherine Kelly Vidal
*Director of the United States Patent and Trademark Office*